United States Patent [19]

Edwards

[11] Patent Number: 4,918,475
[45] Date of Patent: Apr. 17, 1990

[54] CAMERA WITH SPECTROSCOPE ATTACHMENT

[76] Inventor: Clarence C. Edwards, 4256 E. Capitol St., Washington, D.C. 20019

[21] Appl. No.: 232,686

[22] Filed: Aug. 16, 1988

[51] Int. Cl.$^4$ .................... G03B 13/02; G03B 17/48
[52] U.S. Cl. ........................................ 354/76; 354/79; 354/224; 354/295; 350/168; 350/287
[58] Field of Search ............... 354/75, 76, 79, 155, 354/145.1, 219, 224, 225, 295; 350/162.17, 168, 286, 287, 315

[56] References Cited

U.S. PATENT DOCUMENTS

| | | |
|---|---|---|
| 599,670 | 2/1898 | Harrison . |
| 2,179,656 | 11/1939 | Estey . |
| 2,218,253 | 11/1940 | Weaver . |
| 2,927,500 | 3/1960 | Belanger et al. . |
| 3,260,180 | 7/1966 | Teeple ................... 354/295 |
| 3,323,429 | 6/1967 | Howard .................. 350/287 |
| 3,363,525 | 1/1968 | Teeple ................... 354/295 |
| 3,446,125 | 5/1969 | Uhlmann ................ 354/295 |
| 3,475,079 | 10/1969 | Stricker . |
| 4,389,118 | 6/1983 | Yuasa et al. . |

Primary Examiner—A. A. Mathews
Attorney, Agent, or Firm—Mason, Fenwick & Lawrence

[57] ABSTRACT

An apparatus is provided which includes a camera with an attachment for spectrally distributing light from a scene to be photographed, in order that the dominant spectrally distributed light color or colors of the scene or a part of it may be observed, and then photographed, as by using a selected filter. Spectral distribution of the light from the scene is achieved by a spectroscope such as a prism or a diffraction grating supported so as to receive light from the scene, preferably light which has passed through the viewfinder and lens in a single lens reflex camera. The spectroscope is supported by and from the camera, as by a support which engages the flash shoe of the camera, or is a clamp and which is preferably adjustable. The camera may be used in conjunction with a microscope.

A method is provided for aligning the prism and forming the lens system of the camera, including directing a laser beam through the prism and through the viewing and focussing lens system of the camera. A further method is the photographing of a scene with color film after a spectrally distributed image of the scene is viewed.

27 Claims, 2 Drawing Sheets

CAMERA WITH SPECTROSCOPE ATTACHMENT

CROSS-REFERENCE TO RELATED APPLICATION

This application discloses in part subject matter set forth in copending application of Clarence C. Edwards, Ser. No. 010,767, filed Feb. 4, 1987, and entitled "APPARATUS FOR VIEWING A REFRACTED IMAGE AND PHOTOGRAPHIC METHOD", now U.S. Pat. No. 4,805,990 granted Feb. 21, 1989.

BACKGROUND OF THE INVENTION

The present invention relates to a camera and a spectroscope attachment for the camera and to methods including a method of color photography utilizing a spectroscope.

Cameras such as single lens reflex cameras are widely used for the photographing of scenes, including objects, persons etc., and the utilization of color film has gained wide acceptance and popularity. Photographers have sought to achieve diverse effects, such as realistic color photographs, artistic color photographs, etc. They have used various types of color film which have been developed over the years, and have used light modifiers, such as filters and polarizers, to achieve desired color photographic effects.

In practicing the art of photography, it has been traditional for the photographer to observe the scene, noting the coloration of the scene and the parts of it, and then to select, as desired, a particular light modifier.

In order to assist the photographer in determining the color of a scene, there have been produced color temperature meters, which are principally used for taking photographs in studios under lighting conditions where extreme accuracy of the color temperature may be required. Such meters compare the relevant amounts of blue and green light in a scene and give a direct reading of the color temperature, expressed in Kelvins. The purpose of such color temperature meters has been to indicate whether the chosen film should be used with or without a correction filter, but use of the color temperature meter is limited, from the practical standpoint, to studio photography. In addition, photographers select film and provide filters for correction in the event that the light from the scene to be photographed does not suitably match the color temperature of the particular selected film being used. This requires a reference to or the memorizing of such facts as that "daylight" film, intended for use at mid-day sunlight, must have an appropriate filter if used with artificial light, in order to avoid an erroneous yellow cast to the resulting photograph. Further, the selection of a filter is to a certain extent dependent upon the judgment or estimation by the photographer of the color temperature of the scene.

The above known equipment and procedures will be seen, therefore, to require either expensive and delicate instruments suitable principally for studio photography, or the memorization of or reference to charts and rules in order to provide a generally highly subjective estimation of color temperature, as in outdoor scenes.

SUMMARY OF THE INVENTION

There is provided a camera for the taking of color photographs in particular, and a spectroscope attachment for causing spectral distribution of the light from the scene to be photographed. The attachment may be a prism for effecting dispersion of the light, or a diffraction grating for diffracting the light. With both, there is achieved spectral distribution of the image of the viewed scene. Preferably, the spectroscope is supported by a releasable connection to the camera, and in position to enable the viewing of the spectrally distributed light from the scene through an optical system of the camera, such as the viewfinder and lens system, or a separate range finder viewer, where provided. Thus, in cameras of the single lens reflex type, the viewing is done through the spectroscope attachment, the viewfinder and the lens; whereas in other types of camera, the viewing is done through the viewfinder or range finder. The attachment is advantageously inserted in the flash shoe of the camera, or may be clamped to the body of the camera where the flash shoe is not appropriately located, or where there is no flash shoe. The support for the prism or diffraction grating forming a part of the present invention enables the spectroscope to be adjustably positioned, so that the proper location thereof relative to the camera is achieved and so that it may be moved to an out-of-the-way position. To effect this, the attachment support may include a movable arm on a pivotal connection between a support arm and the spectroscope.

The photographer, with the use of the spectroscope attachment, views the scene to be photographed and determines the dominant distributed color or colors, due to the spectral distribution of the light from the scene which is made apparent by the spectroscope attachment. Having thus determined one or more significant light components not apparent to the unaided eye, the photographer may then proceed to photograph the scene with the camera using color sensitive film. He may decide, depending upon the desired effect, not to utilize a color filter, or may decide to utilize a color filter and to select the desired color filter to, for example, enhance a color revealed by the spectral diffusion, or to diminish it.

To provide the necessary precise positioning of the spectral distribution means, such as the light dispersing prism, the shutter of, for example, a single lens reflex camera is held open, and a laser beam is passed first through the prism, and then into the viewfinder, exiting through the lens system. If the prism is properly positioned and the camera properly focussed, a single red spot will appear on a surface some six feet from the camera lens, but if not, a multiplicity of such spots will be seen, the image being created by the out of focus optical system of the camera in that instance.

The camera with the spectrometer attachment may be utilized not only for photographing scenes, including landscapes, portraits, objects, etc., but may also be used in association with a microscope for providing a color photograph of a specimen on a slide in order achieve superior color photographic images of the specimen.

Among the objects of the present invention are the provision of apparatus for enabling the obtaining of color photographs with superior and enhanced results.

Another object of the present invention is to provide a camera and attachment, and related method for enabling a photographer to achieve knowledge of dominant spectrally distributed coloration in a scene and to thereafter obtain a color photograph based on the knowledge obtained.

Yet another object of the present invention is to provide a method for aligning a prism attached to a camera and for focussing the camera for use in achieving spectral distribution of light by a spectroscope.

A further object of the present invention is the provision of apparatus for obtaining superior color photographs which includes an attachment for effecting spectral distribution of the light of a scene to be photographed, which attachment may be readily assembled to and removed from the camera.

A still further object of the present invention is to provide an attachment as above set forth which supports a spectroscope so that it may be moved between operative and inoperative positions.

Another object is the provision of a spectroscope attachment for releasably connecting a spectroscope to a camera.

Other objects and many of the attendant advantages of the present invention will be readily understood from consideration of the following specification, claims and drawings.

DESCRIPTION OF THE PREFERRED EMBODIMENTS

Figure 1:
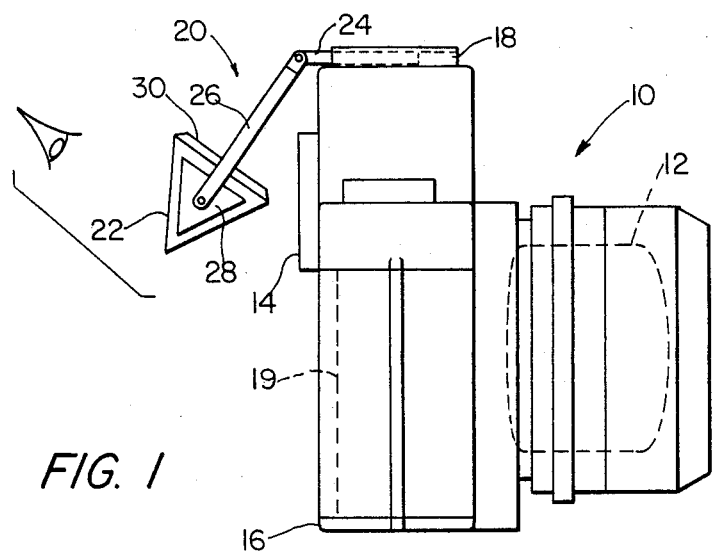
FIG. 1 is an elevational view of a single lens reflex camera with a spectroscope in the form of a prism attached to it.

Referring now to the drawings, wherein like or corresponding reference numerals are used to designate like or corresponding parts throughout the several views, there is shown in FIG. 1 a single lens reflex camera generally designated 10, which includes, as is conventional, a lens system 12, and a viewfinder 14, there being a pentaprism (not shown) in the optical path between the lens system 12 and the viewfinder 14. At the top of the camera body 16 is a flash shoe 18 of conventional construction and forming an elongate socket. The camera 10 has color film 19 therein, the optical path including lens system 12 in advance of the color film 19.

An attachment 20 includes a spectroscope for spectrally distributing light, which is, in the embodiment shown in FIG. 1, a prism 22 which effects dispersion of light received from the scene to be photographed. The scene may be landscapes, seascapes, persons, objects, etc., and including any object or objects of which a color photograph is desired. The light rays forming the image of the scene pass into the camera 10, through the lens system 12, the pentaprism and thence into the prism 22 of attachment 20, through which the scene is viewed. Whereas the eye viewing the scene without spectral distribution of light from the scene would not be aware of dominating color temperature components of the scene viewed, the spectral distribution of the light from the scene, resulting from the passage of that light through the prism 22 and its consequent dispersion provides a strong and different image to the eye.

More particularly, the image of a scene as viewed through the camera 10 and attachment 20 will provide when viewing a grove of trees, for example, a previously unseen red component, and when viewing buildings, on some a blue component and on others a red component, at the boundaries thereof. For different scenes and different objects, different colors of the spectrum will be revealed which would have an effect on the resulting color photograph, which effect can be ignored, enhanced or diminished by the photographer, as described below.

On the upper surface of the prism 22, which is the surface which neither receives light rays from the scene nor is traversed by light rays from the scene, is a light shield 30. Light shield 30 avoids the entry of unwanted light into the prism 22, thereby enhancing the functioning of prism 22.

Figure 2:
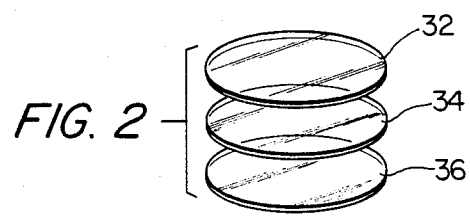
FIG. 2 is a perspective view of a plurality of filters.

In FIG. 2, there is shown a collection of color filters 32, 34 and 36 of conventional construction and of different colors. Such filters are commercially available and, while three filters have been illustrated, it will be appreciated that a larger number of filters would typically be provided.

The photographer, upon viewing the scene through the camera 10 and attachment 20, and noting dominant coloration, that is, one or more colors as revealed by the spectral distribution of light caused by the dispersion of light from the viewed scene by the prism 22, will decide whether to photograph the scene using a filter of not, and if so, which one or ones of the filter will be used for photographing the scene.

Referring again to FIG. 1, the attachment 20 comprises support for the prism 22 which includes a plate 24 sized and shaped to be inserted into the flash shoe 18, so as to be releasably held therein. Each of a pair of arms 26, one of which is shown in FIG. 1, is pivotally connected to the end of plate 24, at one end thereof, and is pivotally connected to an anchor plate 28 secured to an end of prism 22, as by a suitable adhesive. Due to frictional resistance, the arm 26 may be moved to and held in a desired angular position relative to the plate 24, and the prism 22 may be rotated between the spaced arms 26, and then maintained in the desired position. Thus, the supporting structure forming a part of the attachment 20 enables the prism 22 to be placed in the optimal position and angular relationship for the viewing of a scene through the camera 10 since the prism 22 can be rotated on an axis through it parallel to its optical faces.

After a scene has been viewed through the spectroscope, if desired, the arm 26 may be swung upwardly to place the prism 22 in an out-of-the-way position, and to permit utilization of the camera 10 in substantially the normal manner. Indicator marks may be utilized to restore the prism 22 to the desired position for the viewing of the next scene to be photographed.

Figure 3:
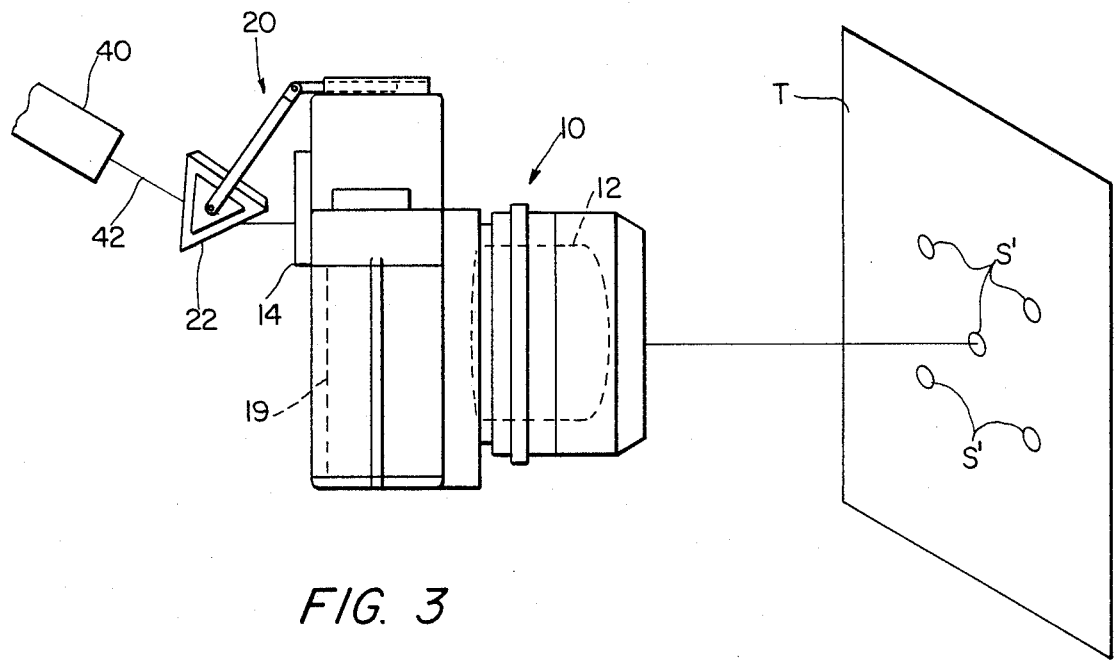
FIG. 3 illustrates a method for positioning the prism in relation to the camera, and including a laser.

To position the prism 22 in the optimum position for viewing a scene and obtaining the necessary spectral distribution by dispersion of the light by the prism, reference is made to FIG. 3, wherein there is shown the camera 10, attachment 20 and prism 22. In addition, there is provided a laser 40 which emits a coherent beam 42 of visible red light. Such lasers are commercially available, and are used in connection with firearms, such as rifles, for aiming. The coherent laser beam 42 passes into the prism and is refracted, and then passes into the viewfinder 14, through the pentaprism and the lens system 12 and out of the camera 10, striking a target T which may be a wall, a screen, etc. If the prism 22 is properly positioned, and the lens system 12 is in focussing position, there will be a single red spot S on the target T, but if it is not, then there will be a plurality of spots S', the number depending upon the particular optical system of the camera 10.

Figure 4:
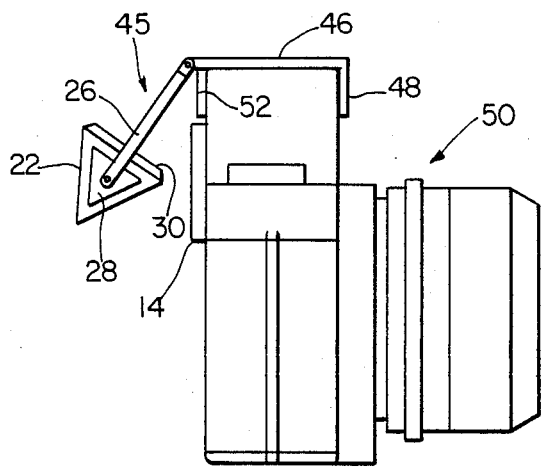
FIG. 4 is an elevational view of a camera and spectroscope attachment having an alternate form of attachment structure.

Referring now to FIG. 4, an alternate embodiment of the invention is shown comprising a camera 50 which differs from camera 10 in that it does not have a flash shoe or a suitably located flash shoe. The attachment 45 for supporting the prism 22 will be seen to include a first arm 46 from which a pair of spaced fingers 48 and 52 depend. The fingers 48 and 52 may be spring urged, or set at the desired distance apart so as to firmly engage spaced, parallel exterior surfaces of the body of the camera 50. As with the attachment 20, a pair of arms 26 depend from the arm 46 and are pivotally attached to prism 22.

Figure 5:
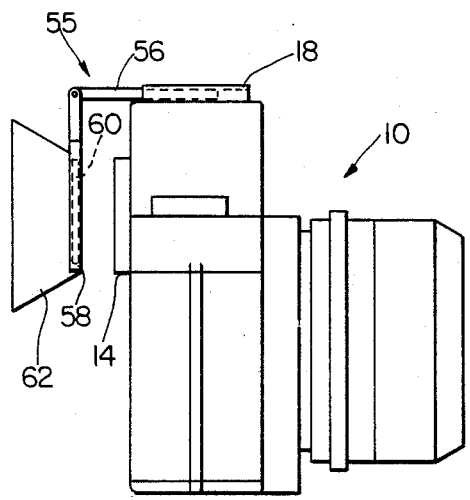
FIG. 5 is an elevational view of a camera with a spectroscope attachment in the form of a diffraction grating.

Referring to FIG. 5, there is shown an alternate embodiment of the invention, there being shown a spectroscope attachment 55 which is releasably connected to the flash shoe 18 of a camera 10, although as will be understood, spectroscope attachment 55 may be of a different construction if a camera without a flash shoe is utilized, such as camera 50. Attachment 55 comprises a plate 56 which will be seen to extend part way into the shoe 18, the extent of entry into the shoe 18 being variable and selected. Pivoted to the end of the plate 56 is a frame 58 within which is a spectroscope in the form of a diffraction grating 60 positioned generally in alignment with the viewfinder 14. A light shield, in the form of cup 62, is provided, attached to the frame 58, so that the eye of a viewer may be placed in close proximity to the diffraction grating 60, with exclusion of a large portion of the light which enters laterally and is not diffracted by the diffraction grating 60. The diffraction grating 60 will cause spectral distribution of light from the scene being viewed through the camera 10 so as to provide to the photographer additional information relative to the light of that scene, in the same manner as light dispersed by the prism 22.

Figure 6:
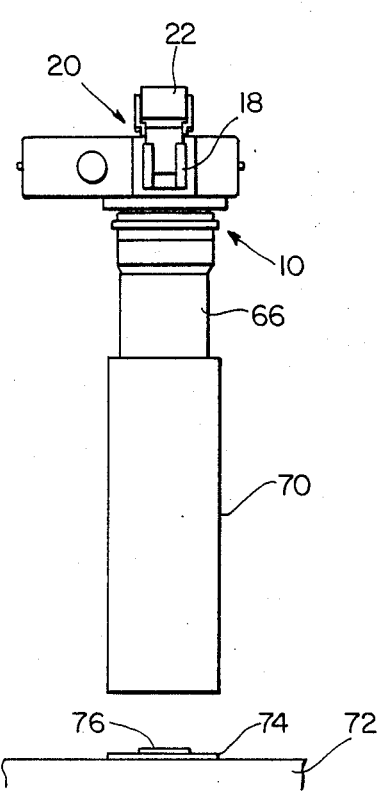
FIG. 6 is an elevational view of a camera and spectroscope attachment in association with a microscope.

Referring to FIG. 6, there is shown a camera 10 having an attachment 20, including prism 22 or other spectroscope. A connecting tube 66 may be used to connect the camera 10 to a microscope 70 mounted above a stage 72 having thereon a slide 74 on which is mounted a specimen 76. By viewing the specimen 76 through the microscope 70, camera 10 and prism 22, a spectrally distributed image of the specimen 76 is obtained, so that the photographer may decide whether to use a filter and, if so, what color the filter should be.

There has been provided a camera for photographing a scene in color, using color sensitive film, together with a spectroscope attachment enabling a spectrally distributed image of a scene to be viewed, to thereby enable the photographer to obtain superior color photographs with enhanced results.

Further, the herein disclosed camera and spectroscope attachment enables the photographer to achieve knowledge of the dominant coloration in the spectrally distributed image in or of a scene and to thereafter obtain a color photograph based upon the knowledge obtained. The noted attachment, for spectral distribution, is readily positioned for appropriate optical alignment with the viewfinder of the camera or other optical viewing system of the camera, may be readily attached to and removed from the camera, and may be moved to a nonuse, out-of-the-way position.

There have been disclosed spectroscope attachments which include two different spectroscopes, being specifically a prism for effecting light dispersion and a diffraction grating for effecting light diffraction. The attachment may be either of a member which will cooperate with the flash shoe of a camera or be clamped or otherwise secured to the body of the camera.

Further, a camera and attachment according to the present invention may be used with a microscope in order to obtain color photographs of a specimen on a slide. In addition, a method is provided for accurately positioning the light dispersions element, such as a prism, comprising the use of a monochromatic laser beam and a suitable target for it after it has passed through the optical system of the camera and the prism.

The claims and the specification describe the invention presented, and the terms that are employed in the claims draw their meaning from the use of such terms in the specification. Some terms employed in the prior art may be broader in meaning than specifically employed herein. Whenever there is a question between the broader definition of such term as used in the prior art and the more specific use of the term herein, the more specific meaning is meant.

What is claimed is:

1. Apparatus for determining the spectral light distribution of a scene and photographing the scene, comprising:
   a camera adapted to have color film therein,
   an optical path including lens means in said camera in advance of color film therein,
   a spectroscope, and
   means for supporting said spectroscope on said camera for movement between a first position for enabling the viewing of a scene therethrough and a second position in which the spectroscope is remote from the optical path in advance of film in said camera.

2. The apparatus according to claim 1, wherein said spectroscope comprises a prism.

3. The apparatus according to claim 2, wherein said supporting means comprises means for adjustably supporting said prism.

4. The apparatus according to claim 3, wherein said supporting means comprises means for supporting said prism for adjustment about an axis generally transverse of an axis parallel to the axis of said lens means.

5. The apparatus according to claim 2, said camera having a flash shoe, and said supporting means comprising means for engaging said flash shoe.

6. The apparatus according to claim 1, said camera having a flash shoe, and said supporting means comprising means for engaging said flash shoe.

7. The apparatus according to claim 1, wherein said means for supporting said spectroscope comprises means for engaging said camera.

8. The apparatus according to claim 7, said engaging means comprising clamp means for engaging the body of said camera.

9. The apparatus according to claim 1, wherein said spectroscope comprises a diffraction grating.

10. The apparatus according to claim 9, and further comprising light shielding means extending from said diffraction grating.

11. The apparatus according to claim 10, wherein said light shielding means comprises an eyecup.

12. The apparatus according to claim 1, wherein said camera has an optical system therein, and means for supporting said spectroscope in position to receive light from said optical system.

13. The apparatus according to claim 12, wherein said optical system comprises a viewfinder, and said supporting means comprises means for supporting said spectroscope in said first position thereof to receive light from a scene which has passed through said viewfinder.

14. The apparatus according to claim 12, said supporting means comprising means for selectively supporting said spectroscope in a second position spaced from said first mentioned position in which second position direct viewing of the scene through said viewfinder is not obstructed by said spectroscope.

15. The apparatus according to claim 1, and further comprising a microscope in advance of the lens means of said camera.

16. For use with a camera capable of containing color film and having a flash shoe providing an elongate socket, a spectroscope attachment comprising:
  means for releasable connection to a camera comprising means for insertion into the socket of the flash shoe,
  means for supporting a spectroscope connected to said releasable connection means, and
  a spectroscope supported by said supporting means.

17. The apparatus of claim 16, and further comprising means for movably connecting said connection means and said supporting means.

18. The apparatus of claim 16, said spectroscope comprising a prism, and said supporting means comprising means enabling rotation of said prism about an axis extending parallel to the optical faces thereof.

19. The apparatus of claim 16, said spectroscope comprising a diffraction grating.

20. A method for aligning a spectroscope with the viewfinder of a camera and for focussing the lens system of said camera comprising:
  providing a camera having a lens system and a through-the-lens viewfinder,
  providing a spectroscope and means for supporting said spectroscope in position to receive light from a scene through said viewfinder and lens system,
  passing a beam of coherent radiation successively through said spectroscope, said viewfinder and said lens system,
  observing the image of said radiation, and
  adjusting said spectroscope and/or said lens system as necessary to focus said image.

21. The method of claim 20, wherein said passing is of a laser beam of visible radiation.

22. The method of claim 20, wherein said passing is of a laser beam of visible red radiation.

23. The method of obtaining a color photograph comprising:
  providing a camera with color film,
  providing a plurality of color filters,
  mounting a spectroscope on said camera,
  observing a scene through said spectroscope, and
  photographing said scene with said camera and color film without dispersion of light in advance of said film by said spectroscope, said photographing being selectively with a said color filter.

24. Apparatus for determining the spectral light distribution of a scene and photographing the scene, comprising:
  a camera adapted to have color film therein,
  an optical path in said camera in advance of said color film,
  a spectroscope,
  means for attaching said spectroscope to said camera for viewing a scene through said spectroscope, and
  means for supporting said spectroscope in a position not in said optical path,
  whereby after viewing the scene with the spectroscope and determining the spectral distribution of the scene, the scene may be photographed by exposure of said film with said spectroscope not in the optical path in advance of said film.

25. For use with a camera capable of containing color film, the camera having a body with spaced parallel exterior surfaces, a spectroscope attachment comprising:
  means for releasable connection to a camera comprising means for clampingly engaging spaced parallel exterior surfaces of the body of said camera,
  means for supporting a spectroscope connected to said releasable connection means, and
  a spectroscope supported by said supporting means.

26. The apparatus of claim 25, and further comprising means for movably connecting said connection means and said supporting means.

27. The apparatus of claim 25, said spectroscope comprising a prism, and said supporting means comprising means for enabling rotation of said prism about an axis extending parallel to the optical faces thereof.

* * * * *